(12) United States Patent
Huang et al.

(10) Patent No.: US 6,526,703 B2
(45) Date of Patent: Mar. 4, 2003

(54) SIMPLE ASSEMBLED SLOW BAKING OVEN DEVICE

(76) Inventors: Yuhn Wern Huang, P.O. Box 63-150, Tai Chung City (406) (TW); Piin Jier Huang, P.O. Box 63-150, Tai Chung City 406 (TW)

( * ) Notice: Subject to any disclaimer, the term of this patent is extended or adjusted under 35 U.S.C. 154(b) by 0 days.

(21) Appl. No.: 09/961,578

(22) Filed: Sep. 22, 2001

(65) Prior Publication Data

US 2002/0153003 A1 Oct. 24, 2002

(30) Foreign Application Priority Data

Apr. 20, 2001 (TW) .................................. 90206435 U

(51) Int. Cl.[7] .................................................. E04B 7/08
(52) U.S. Cl. ............................. 52/81.1; 52/81.5; 126/8; 126/151
(58) Field of Search ................................ 52/81.1, 81.5, 52/89, 80.1; 126/19 R, 39 C, 8, 275 R, 151

(56) References Cited

U.S. PATENT DOCUMENTS

| 671,199 A | * | 4/1901 | White | 52/81.1 |
| 3,171,370 A | * | 3/1965 | Fay | 110/335 |
| 3,600,844 A | * | 8/1971 | Simpson | 46/16 |

* cited by examiner

Primary Examiner—Carl D. Friedman
Assistant Examiner—Naoko Slack

(57) ABSTRACT

The present invention relates to a simple assembled slow baking oven device, comprising a net member with a predetermined area; a plurality of clay blocks being flatly disposed on the surface of its top layer in a radiant form; an opening being disposed at the center of the net member; and each clay block has a coupling section for embedding another clay block on its lateral sides, such that when the opening at the center of the net member is pulled upward, the surrounding clay blocks will rise accordingly, and the gravity of the blocks automatically make the blocks to couple with each other on the lateral sides, and thus quickly completes a clay housing assembly for its use as a slow baking oven.

8 Claims, 7 Drawing Sheets

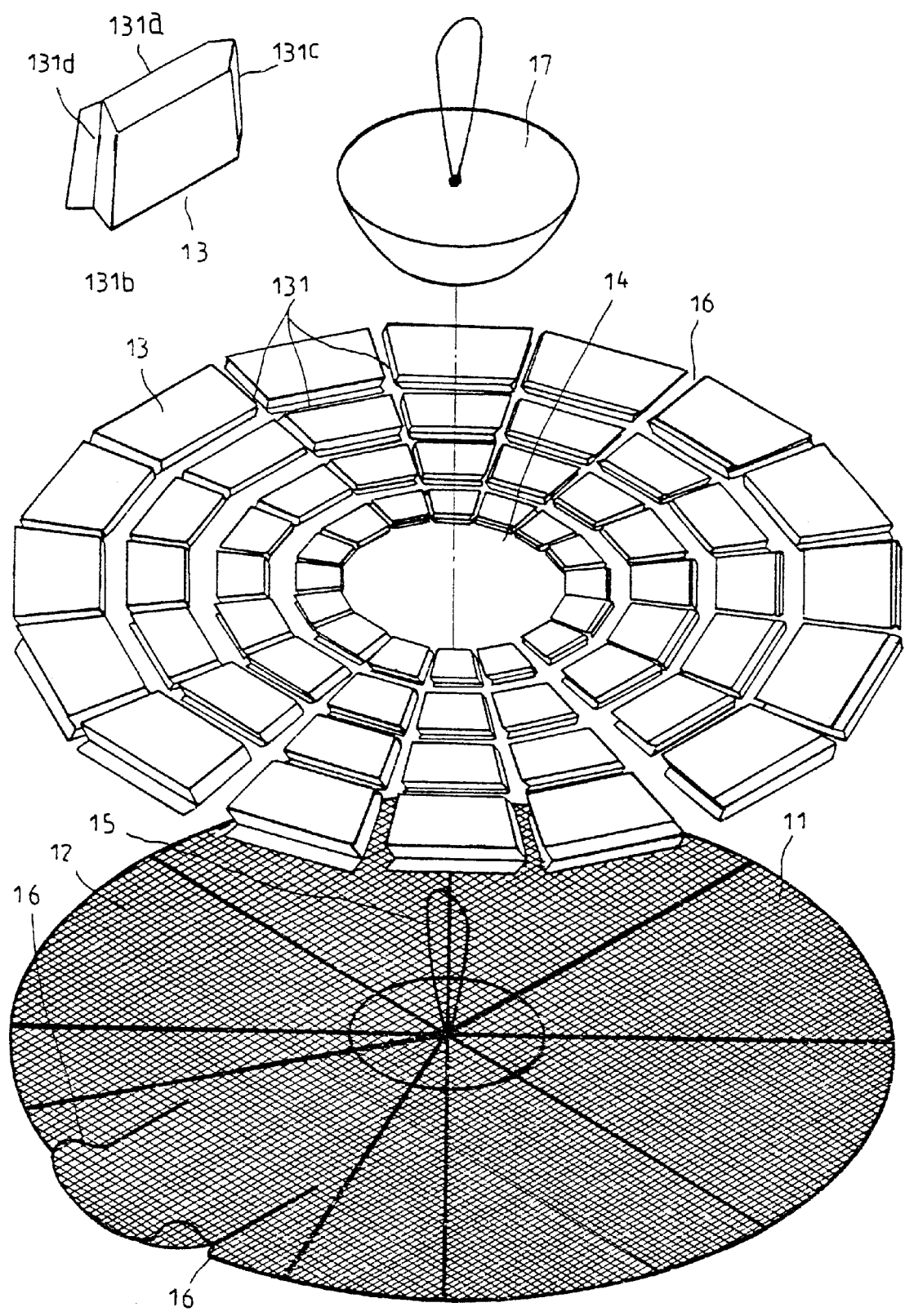
F I G. 1

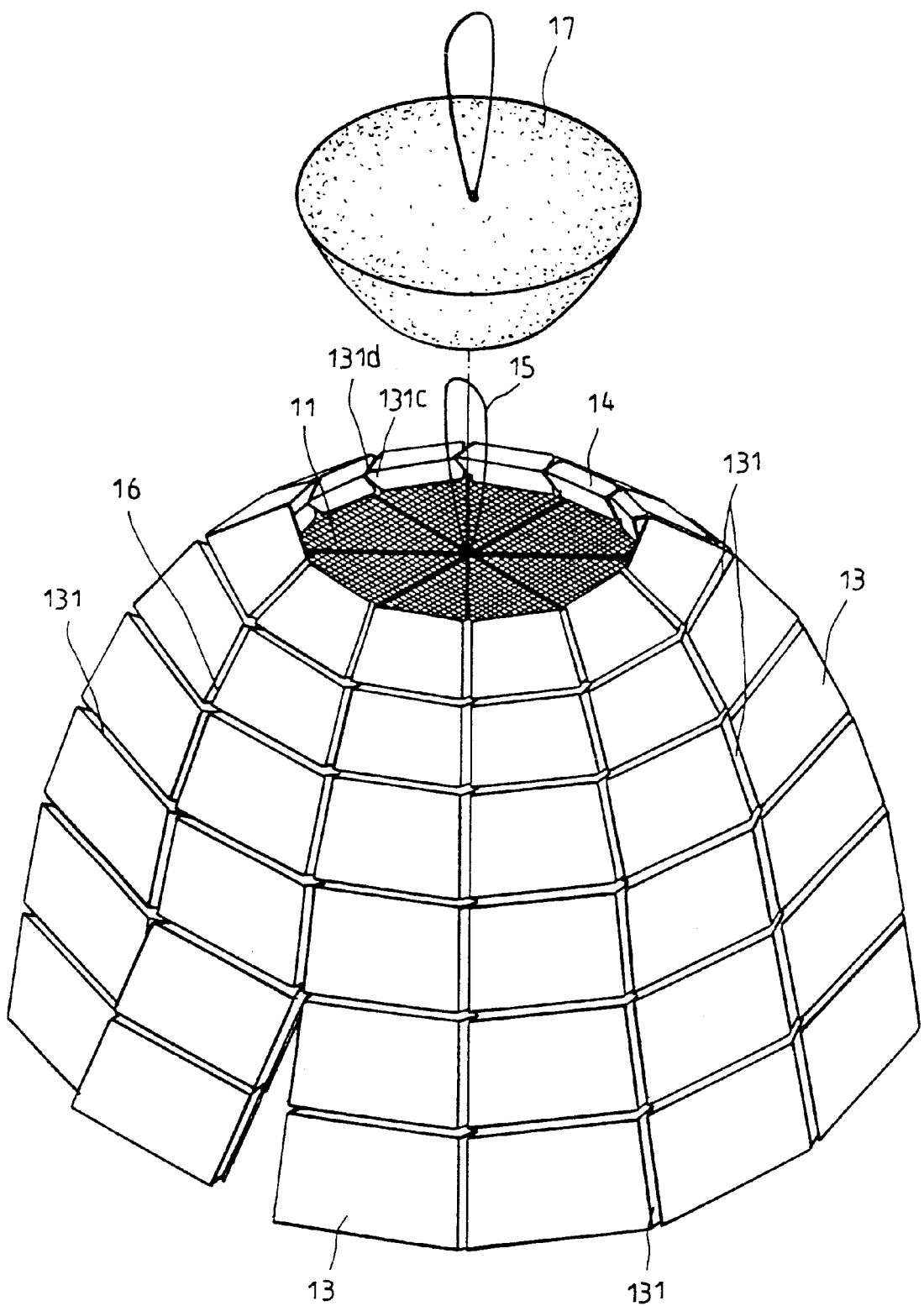
F I G. 3

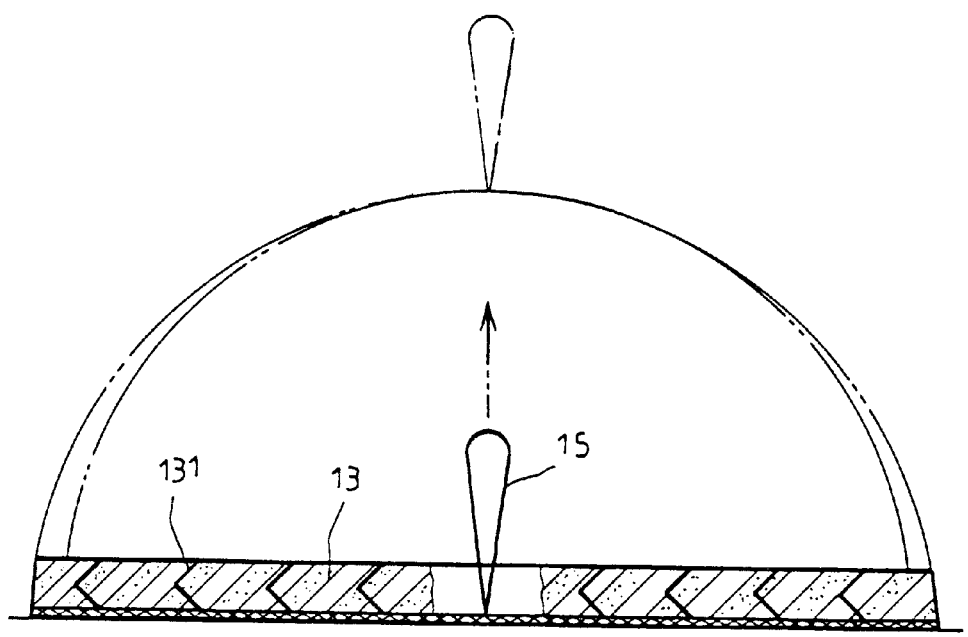
F I G. 4
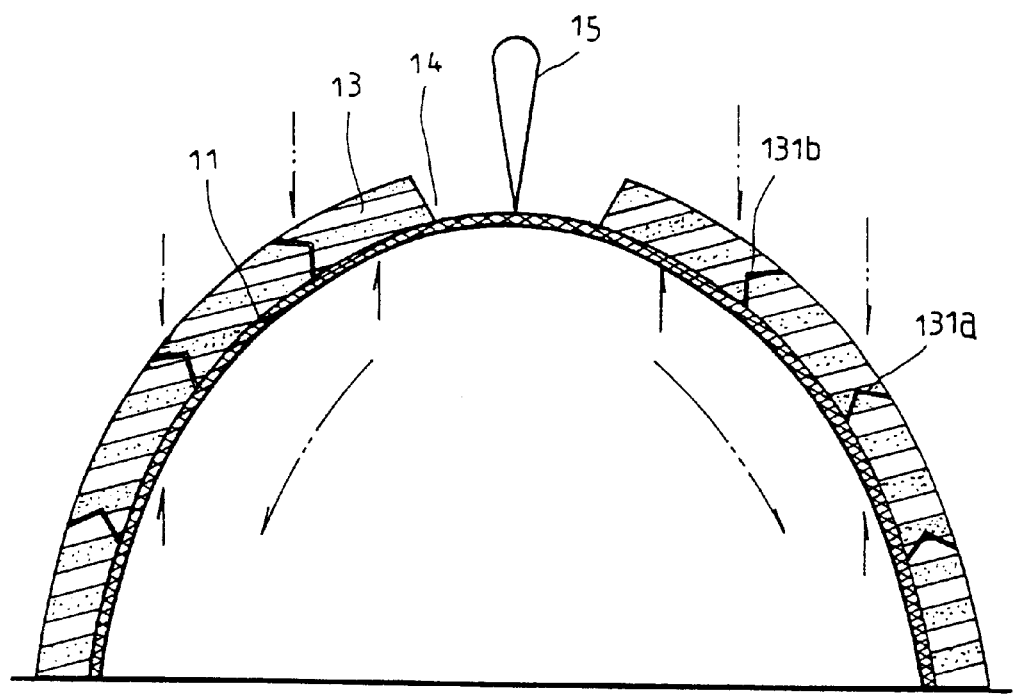
F I G. 5

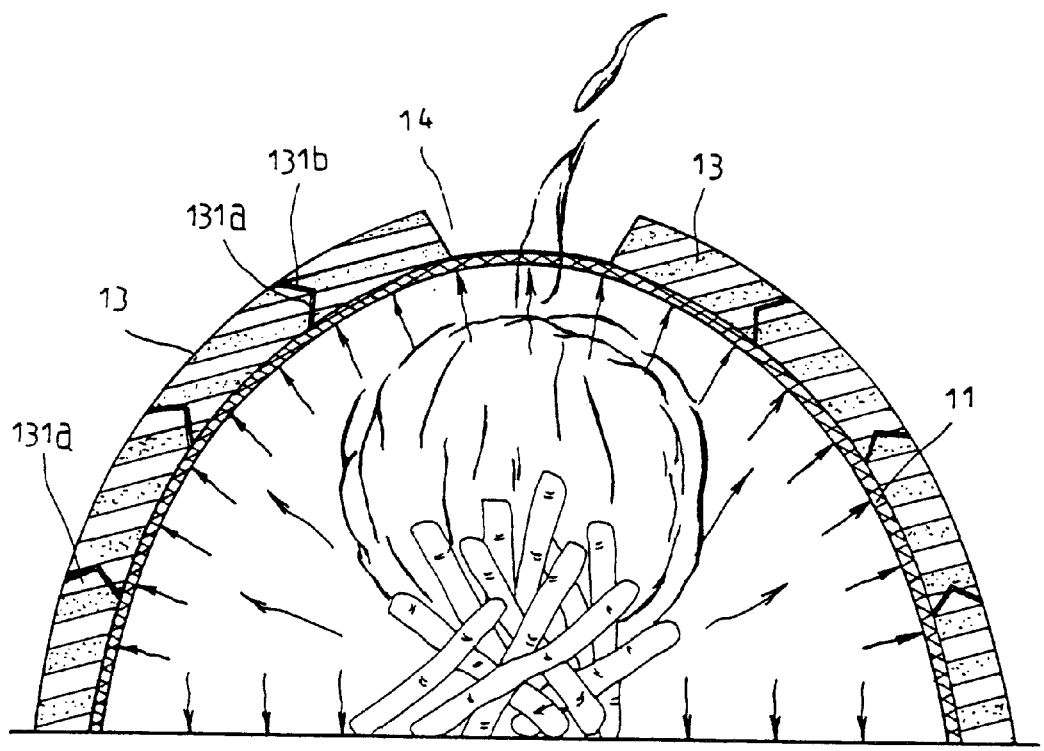
F I G. 6
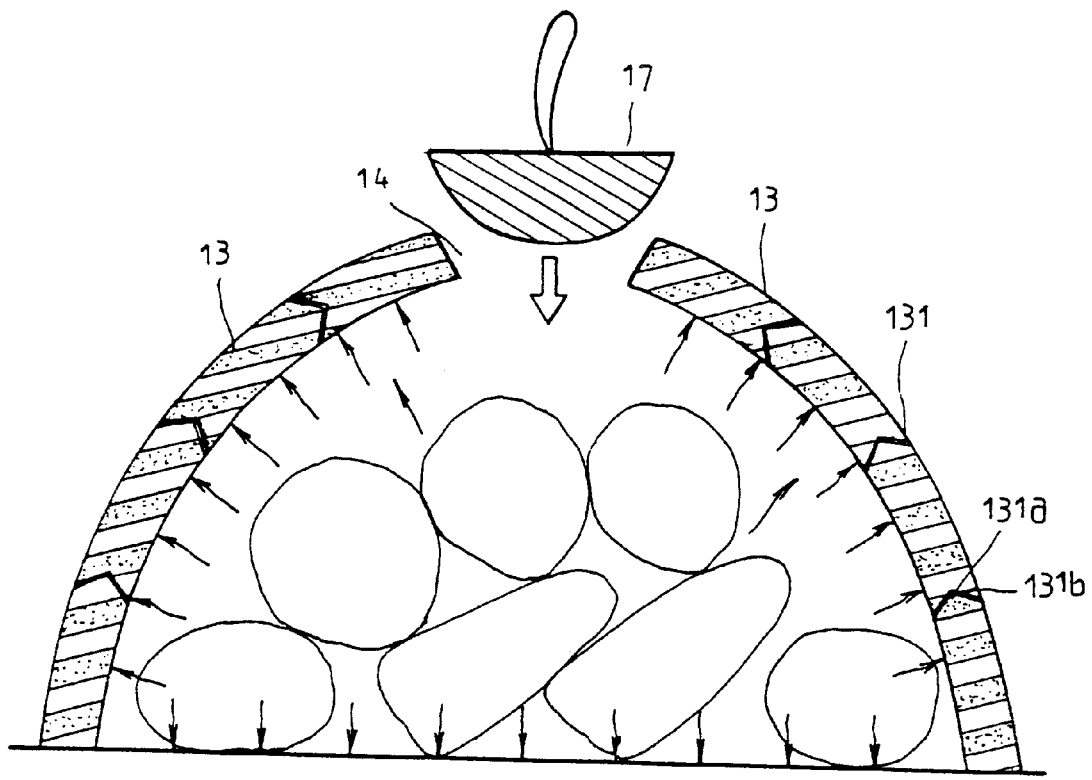
F I G. 7

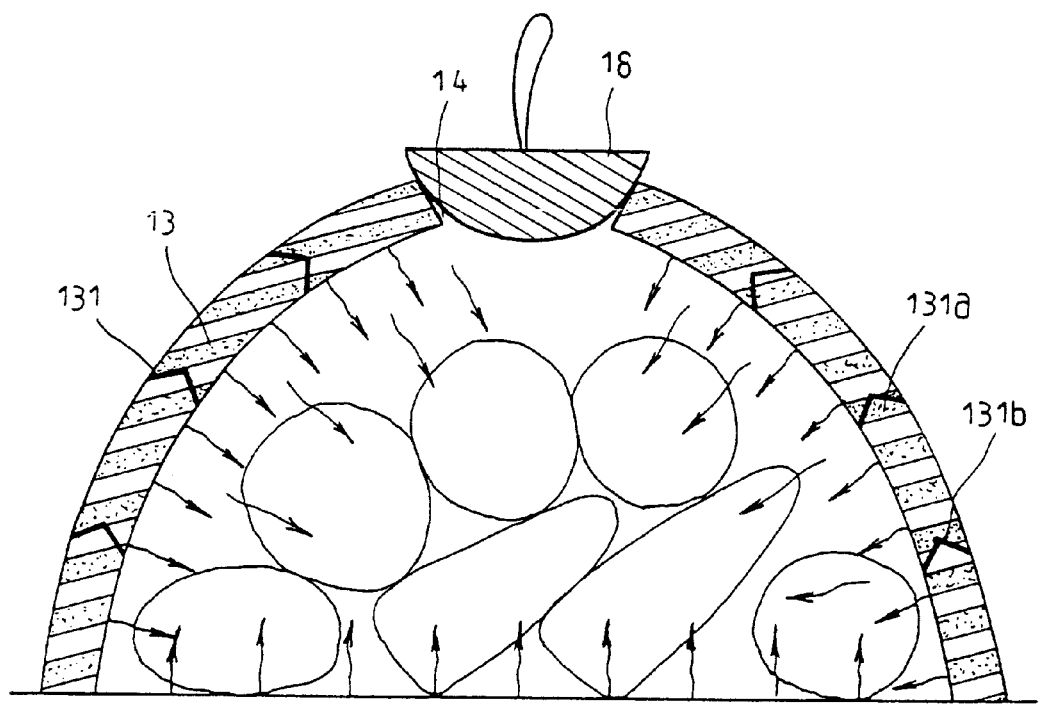
F I G. 8
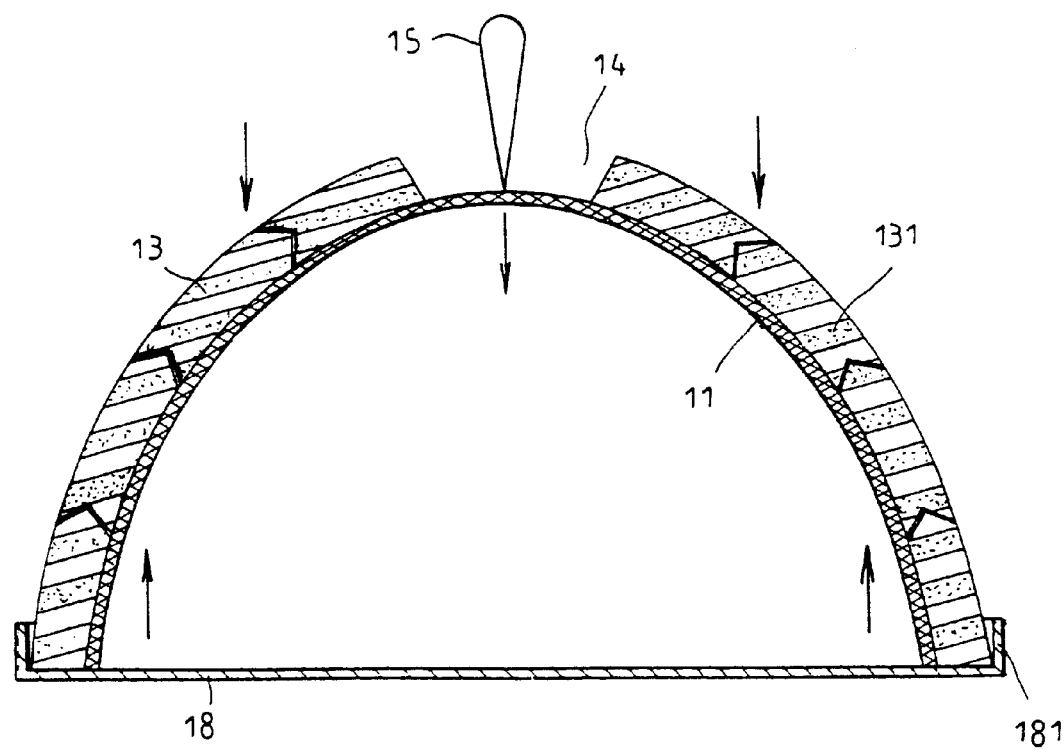
F I G. 10

US 6,526,703 B2

SIMPLE ASSEMBLED SLOW BAKING OVEN DEVICE

BACKGROUND OF THE INVENTION

1. Field of the Invention

The present invention relates to a slow cooking utility, more particularly to a portable and easy-to-assemble slow baking oven of which the user just needs to pull the device to quickly complete the clay housing assembly for slow baking.

2. Description of the Prior Art

As in the past, it is very common to see a scene in the countryside that after harvest, the rice field is dried and ploughed for some time. When the earth dries in the form of blocks, the children will pile up the clay blocks in different sizes to form a clay housing for the use as slow baking oven. In the piling process, large blocks are placed at the bottom layer, and three larger ones are arranged in the front of the clay housing to set up a space for the wood to be burned in it. The higher the position of the housing, the smaller are the clay blocks used; and as we reach to the top of the housing, it tapers to form a roof for the clay oven. After the clay blocks are burned to certain temperature, the ash inside is removed to make room for accommodating the food such as potatoes, yams, corns, and meat. The above-mentioned food may be wrapped with tin foil first, and placed into the oven for cooking until the food is completely cooked. Such way of cooking by the direct contact of hot clay blocks for a period of time definitely differs from the method of fast heating cooking. Therefore its unique cooking style relies on the construction of the clay housing. It takes a skillful handcraft and a pre-dried clay blocks to build the clay oven, and it especially takes lots of people with division of labor for such construction before we can enjoy a delicious meal at last. Actually, the joy of having a good meal after working together as a team and the memory about good old days that we can obtain natural materials in the countryside for the cooking are something we all long for. However, it is not easy to have such anymore in the busy commercial and industrial modes nowadays. The main reason is that it is no longer easy to obtain a large place, clay materials to build the clay oven, and the time to build the clay oven. In addition, it also requires a skillful person to build the oven. Therefore, the slow cooking of such innovative leisure countryside activity gradually fades out.

In view of the shortcomings of the prior art mentioned above, the inventor of in the related industry conducted extensive research to resolve the foregoing shortcomings and invented a simple assembled slow baking oven device of the present invention. By the space structural design, the user can prop up a clay oven anytime for slow baking purpose in order to resolve the shortcomings of not easy to pick up the clay blocks in the countryside and the difficulty of building the clay oven.

Therefore, the primary objective of the present invention is to provide a simple assembled slow baking oven device, comprising a net member with a predetermined area; a plurality of clay blocks being flatly disposed on the surface of its top layer in a radiant form; an opening being disposed at the center of the net member; and each clay block has a coupling section for embedding another clay block on its lateral sides, such that when the opening at the center of the net member is pulled upward, the surrounding clay blocks will rise accordingly, and the gravity of the blocks automatically make the blocks to couple with each other on the lateral sides, and thus quickly completes a clay housing assembly for its use as a slow baking oven.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which:

FIG. 1 shows the disassembled parts of the structure according to a preferred embodiment of the present invention.

FIG. 3 is a three-dimensional diagram showing the assembled structure of the present invention when it is propped up.

FIG. 4 shows the propped structure of the present invention as the net member is pulled upward.

FIG. 5 shows the operation for the coupling of the clay blocks on the net by the gravitational force downward as the structure according to the present invention is propped up.

FIG. 6 shows the fire within the interior of the slow baking oven according to the present invention when it is propped up.

FIG. 7 shows the operation of putting the raw food into the highly heated interior of the clay oven according to the present invention.

FIG. 8 shows the slow baking operation in the highly heated interior when the slow baking oven according to the present invention as it is in a close system.

FIG. 10 shows the cross-sectional view of the disassembled structure of the preferred embodiment as shown in FIG. 9

DETAILED DESCRIPTION OF THE PREFERRED EMBODIMENT

Figure 2:
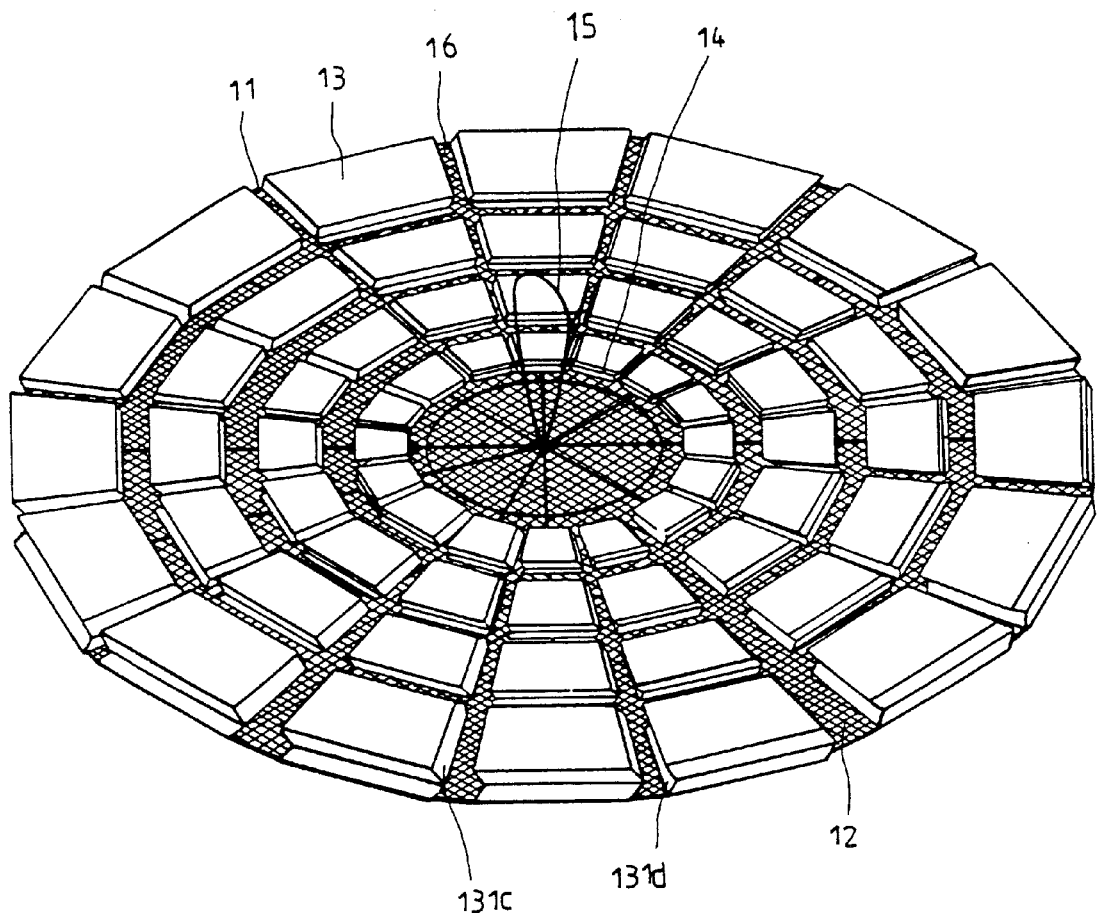
FIG. 2 is a three-dimensional diagram showing the assembled structure of the present invention when it is flatly placed.

Please refer to FIGS. 1 and 2 for the simple assembled slow baking oven device comprising a net member 11, and such net member is of a predetermined area preferably knitted by combustible wires; a plurality of clay blocks 13 being flatly disposed on the surface of its top layer 12 in a radiant form; an opening 14 being disposed at the center of the net member 11, and a pulling string 15 is added for the user to pull; and a groove opening 16 is disposed on both lateral sides at a predetermined angle on the outer circumference of the net member 11 such that the flatly disposed clay blocks 13 could be lift up individually if needed (see FIG. 3).

In addition, please refer to FIG. 1 again. Each clay block 13 has a relative thickness and its side has a coupling section 131 for embedding the sides of another clay block. This embodiment makes use of a protruded coupling section 131*a* disposed on the upper side of the thickness and a recessive coupling section 131*b* on the lower side of the thickness, and both sides have a protruded coupling section 131*c* and a concessive coupling section 131d one on each side. When the opening 14 of the net member 11 is pulled at its central position, the surrounding clay blocks 13 will rise accordingly, and under the gravitational force, the thickness of the coupling section 131 will mutually couple with another clay block and the net member props up to quickly finish the assembly of the housing 10 of a clay oven for slow baking.

Furthermore, please refer to FIG. 2 again. The simple assembled slow baking oven device according to the above description keeps an appropriate interval 132 between two adjacent clay blocks 13, and the coupling sections 131 on the side of the thickness are coupled with corresponding concave and convex angle such that the assembly and propping up of the clay blocks 13 can be achieved easily. In order to enhance the slow baking efficiency, a sealing member 17 can be added to cover the opening 14 at the central position of the net member 11 as shown in FIG. 3 and thus prevents the hot airflow from leaking out of the housing 10 of the clay oven.

Furthermore, please refer to FIG. 10. To secure the assembly and propping up of the housing 10 of the clay oven, a base tray 18 can be placed under the net member 11 in advance, and the periphery of the base tray 18 has a surrounding wall 181 as shown in FIG. 9, and by means of such surrounding wall 181 being vertically sealed the base of the periphery of the clay oven housing 10 and it limits the housing from moving and therefore reinforce the security of the base tray of the clay oven housing.

Please refer to FIGS. 4 and 5 for the operation of the oven. Firstly, the user pulls the central pulling string 15 upward, and it brings the clay blocks which are attached on the net member 11 to rise appropriately, and then it will suspend to an appropriate position. The clay blocks 13 arranged in radiant pattern allow each of the upper protruded section 131a on the surface of the clay block 13 attached on the net member 11 to embed into the recessive coupling section 131b of another clay block on the next lower layer due to the gravitational force, and the lateral protruded coupling section 131c will be embedded into the recessive coupling section 131d on the lateral side of the adjacent clay block, so that they can be mutually coupled and set up on the ground with an external appearance of a clay oven housing 10 as shown in FIG. 3. The two groove openings 16 of the net member 11 can be lift up to expose an oven door for the user to put in woods for the combustion (as shown in FIG. 6). After the temperature gradually rises, the net member 11 will be burned out. The clay blocks are burned continuously until it reaches the desired temperature, and then the ash inside the oven can be removed. Wrap the food such as potato, yam, corn, or meat by tin foil, and place them into the space of the clay oven housing 10 as shown in FIG. 7, and then close the opening 14 of the net member by a sealing member 17, and the two groove opening acting as the oven door should be closed as well so that the whole clay oven housing is in close system as shown in FIG. 8. Such arrangement allows the temperature to stay inside the clay oven housing for some time and cook the food in the oven until they are cooked well.

Figure 9:
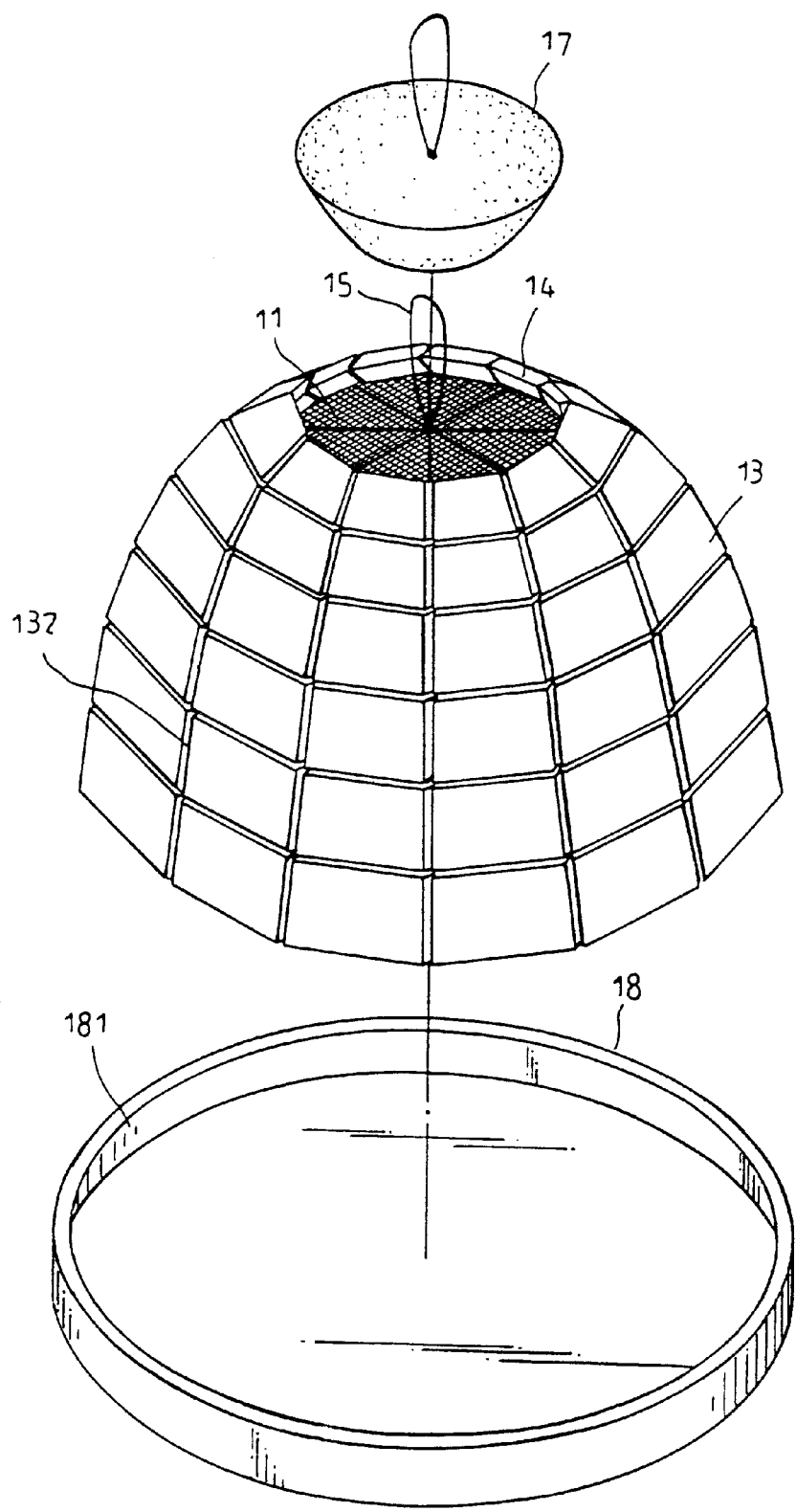
FIG. 9 shows another preferred embodiment of the present invention as a tray is added.

FIGS. 9 and 10 show another embodiment of the present invention. A heat-resistant base tray 18 is disposed under net member 11 of the clay oven housing 10 in advance, and then the clay oven housing 10 is placed inside the tray. In the meantime, make use of the sidewall at the periphery of the base tray to secure the oven as well as giving a base tray for the clay oven housing for indoors use. It provides a safer way to enjoy the cooking and provides the joy of slow baking without the need to go outdoors.

Therefore, in summation of the above description, the present invention meets the requirements of patentability, which is hereby submitted for patent application. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A simple assembled slow baking oven device, comprising a net member with a predetermined area and a center; a plurality of clay blocks being flatly disposed on a top layer of the net member in a radiant form; an opening being disposed at the center of the net member; and each clay block has a coupling section for embedding another clay block on its lateral sides, such that when the opening at the center of the net member is pulled upward, the surrounding clay blocks will rise accordingly, and the gravity of the blocks automatically make the blocks to couple with each other on the lateral sides, and thus quickly completes a clay housing assembly for its use as a slow baking oven.

2. A simple assembled slow baking oven device as claimed in claim 1, wherein said center of the net member having a pulling string above the opening.

3. A simple assembled slow baking oven device as claimed in claim 1, wherein said net member is made of combustible wires.

4. A simple assembled slow baking oven device as claimed in claim 1, wherein said net member having a groove opening on its circumference at a predetermined central angle from the lateral sides, thereby the clay blocks are able to be lifted individually.

5. A simple assembled slow baking oven device as claimed in claim 1, wherein said clay blocks being attached on the net members are separated from each other with an appropriate intervals, thereby allows an easy propping for the clay blocks.

6. A simple assembled slow baking oven device as claimed in claim 1, wherein said coupling sections of the clay blocks are coupled with corresponding concave and convex angles.

7. A simple assembled slow baking oven device as claimed in claim 1, wherein said net member further comprising a sealing member being disposed at the opening of the net member to cover the clay oven housing for better baking effect.

8. A simple assembled slow baking oven device as claimed in claim 1, wherein said net member having a heat-resistant base tray at its bottom, and the base tray has a sidewall around the periphery of the base tray to reinforce the security of the propping of the clay oven housing.

* * * * *